US012705513B2

(12) United States Patent
Zhou et al.

(10) Patent No.: US 12,705,513 B2
(45) Date of Patent: Aug. 11, 2026

(54) METHOD, DEVICE AND STORAGE MEDIA FOR MULTI-AGENT MOTION PREDICTION

(71) Applicant: City University of Hong Kong, Hong Kong (HK)

(72) Inventors: Zikang Zhou, Hong Kong (HK); Jianping Wang, Hong Kong (HK)

(73) Assignee: City University of Hong Kong, Hong Kong (HK)

(*) Notice: Subject to any disclaimer, the term of this patent is extended or adjusted under 35 U.S.C. 154(b) by 829 days.

(21) Appl. No.: 17/887,523

(22) Filed: Aug. 15, 2022

(65) Prior Publication Data

US 2023/0409937 A1 Dec. 21, 2023

(30) Foreign Application Priority Data

Jun. 17, 2022 (CN) ......................... 202210689923.7

(51) Int. Cl.
*G06N 7/00* (2023.01)
*G06N 20/00* (2019.01)

(52) U.S. Cl.
CPC ............... *G06N 7/00* (2013.01); *G06N 20/00* (2019.01)

(58) Field of Classification Search
CPC ................................ G06N 7/00; G06N 20/00
See application file for complete search history.

(56) References Cited

PUBLICATIONS

Chandra et al., Forecasting Trajectory and Behavior of Road-Agents Using Spectral Clustering in Graph-LSTMs, Aug. 2020. (Year: 2020).*

Li et al., GRIP: Graph-based Interaction-aware Trajectory Prediction, 2019 IEEE Intelligent Transportation Systems Conference (ITSC), Oct. 2019. (Year: 2019).*

Chai Y, Sapp B, Bansal M, et al., Multipath: Multiple probabilistic anchor trajectory hypotheses for behavior prediction, arXiv preprint arXiv:1910.05449, 2019.

Cui H, Radosavljevic V, Chou F C, et al. , Multimodal trajectory predictions for autonomous driving using deep convolutional networks, 2019 International Conference on Robotics and Automation (ICRA). IEEE, 2019: 2090-2096.

Hong J, Sapp B, Philbin J., Rules of the road: Predicting driving behavior with a convolutional model of semantic Interactions, Proceedings of the IEEE/CVF Conference on Computer Vision and Pattern Recognition. 2019: 8454-8462.

Bansal M, Krizhevsky A, Ogale A., Chauffeurnet: Learning to drive by imitating the best and synthesizing the worst, arXiv preprint arXiv:1812.03079, 2018.

(Continued)

*Primary Examiner* — Marshall L Werner
(74) *Attorney, Agent, or Firm* — Idea Intellectual Limited; Sam T. Yip

(57) ABSTRACT

A multi-agent motion prediction method is performed by a system. The system may take each of the agents in a traffic scenario as a central agent respectively, and divide the traffic scenario into different areas according to the central agent. After that, a local eigenvector is obtained for each of the central agents in the area, and the coordinate system of local eigenvectors between all of the central agents is corrected. As a result, the motion for each of the central agents in accordance with local eigenvectors of each of the central agents and long-range dependencies is predicted by obtaining long-range dependencies between each of the central agents.

6 Claims, 6 Drawing Sheets

(56) References Cited

PUBLICATIONS

Djuric N, Radosavljevic V, Cui H, et al., Uncertainty-aware short-term motion prediction of traffic actors for autonomous driving, Proceedings of the IEEE/CVF Winter Conference on Applications of Computer Vision. 2020: 2095-2104.

Salzmann T, Ivanovic B, Chakravarty P, et al., Trajectron++: Dynamically-feasible trajectory forecasting with heterogeneous data, Computer Vision—ECCV 2020: 16th European Conference, Glasgow, UK, Aug. 23-28, 2020, Proceedings, Part XVIII 16. Springer International Publishing, 2020: 683-700.

Gilles T, Sabatini S, Tsishkou D, et al., HOME: Heatmap Output for future Motion Estimation, arXiv preprint arXiv:2105.10968, 2021.

Alahi A, Goel K, Ramanathan V, et al., Social LSTM: Human trajectory prediction in crowded spaces, Proceedings of the IEEE conference on computer vision and pattern recognition. 2016: 961-971.

Rhinehart N, Kitani K M, Vernaza P., R2P2: A reparameterized pushforward policy for diverse, precise generative path forecasting, Proceedings of the European Conference on Computer Vision (ECCV). 2018: 772-788.

Rhinehart N, McAllister R, Kitani K, et al., PRECOG: Prediction conditioned on goals in visual multi-agent settings, Proceedings of the IEEE/CVF International Conference on Computer Vision. 2019: 2821-2830.

Gao J, Sun C, Zhao H, et al., VectorNET: Encoding hd maps and agent dynamics from vectorized representation, Proceedings of the IEEE/CVF Conference on Computer Vision and Pattern Recognition. 2020: 11525-11533.

Liang M, Yang B, Hu R, et al., Learning lane graph representations for motion forecasting, European Conference on Computer Vision. Springer, Cham, 2020: 541-556.

Ye M, Cao T, Chen Q., TPCN: Temporal Point Cloud Networks for Motion Forecasting, Proceedings of the IEEE/CVF Conference on Computer Vision and Pattern Recognition. 2021: 11318-11327.

Gupta A, Johnson J, Fei-Fei L, et al., Social gan: Socially acceptable trajectories with generative adversarial networks, Proceedings of the IEEE Conference on Computer Vision and Pattern Recognition. 2018: 2255-2264.

Deo N, Trivedi M M., Convolutional social pooling for vehicle trajectory prediction, Proceedings of the IEEE Conference on Computer Vision and Pattern Recognition Workshops. 2018: 1549-1557.

Casas S, Gulino C, Liao R, et al., SpAGNN: Spatially-aware graph neural networks for relational behavior forecasting from sensor data, 2020 IEEE International Conference on Robotics and Automation (ICRA). IEEE, 2020: 9491-9497.

Huang Y, Bi H K, Li Z, et al., STGAT: Modeling spatial-temporal interactions for human trajectory prediction, Proceedings of the IEEE/CVF International Conference on Computer Vision. 2019: 6271-6280.

Mohamed A, Qian K, Elhoseiny M, et al., Social-STGCNN: A social spatio-temporal graph convolutional neural network for human trajectory prediction, Proceedings of the IEEE/CVF Conference on Computer Vision and Pattern Recognition. 2020: 14424-14432.

Li L L, Yang B, Liang M, et al., End-to-end contextual perception and prediction with interaction transformer, 2020 IEEE/RSJ International Conference on Intelligent Robots and Systems (IROS). IEEE, 2020: 5784-5791.

Mercat J, Gilles T, El Zoghby N, et al., Multi-head attention for multi-modal joint vehicle motion forecasting, 2020 IEEE International Conference on Robotics and Automation (ICRA). IEEE, 2020: 9638-9644.

Yu C, Ma X, Ren J, et al., Spatio-temporal graph transformer networks for pedestrian trajectory prediction, European Conference on Computer Vision. Springer, Cham, 2020: 507-523.

Liu Y, Zhang J, Fang L, et al., Multimodal Motion Prediction with Stacked Transformers, Proceedings of the IEEE/CVF Conference on Computer Vision and Pattern Recognition. 2021: 7577-7586.

Ngiam J, Caine B, Vasudevan V, et al., Scene Transformer: A unified architecture for predicting multiple agent trajectories, arXiv preprint arXiv:2106.08417, 2021.

Giuliari F, Hasan I, Cristani M, et al., Transformer networks for trajectory forecasting, 2020 25th International Conference on Pattern Recognition (ICPR). IEEE, 2021: 10335-10342.

Yuan Y, Weng X, Ou Y, et al., AgentFormer: Agent-Aware Transformers for Socio-Temporal Multi-Agent Forecasting, arXiv preprint arXiv:2103.14023, 2021.

Zikang Zhou et al., “HiVT: Hierarchical Vector Transformer for Multi-Agent Motion Prediction,” IEEE/CVF Conference on Computer Vision and Pattern Recognition (CVPR), 2022, p. 8823-8833.

* cited by examiner

METHOD, DEVICE AND STORAGE MEDIA FOR MULTI-AGENT MOTION PREDICTION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to agent recognition technology. More specifically, the present invention relates to a method, a device and a storage media for multi-agent motion prediction.

BACKGROUND OF THE INVENTION

Accuracy is very important for predicting the motion trajectories of surrounding traffic participants for the safety of autonomous driving. Therefore, autonomous vehicles need to understand their surroundings and predict the future trajectories of other vehicles on the road. However, the problem of predicting the future motion of nearby agents, such as vehicles, bicycles and pedestrians, is complicated because the goals or intentions of these traffic agents may be unknown. In multi-agent traffic scenarios, the behaviour of an agent is determined by complex interactions with other agents. This interaction is further intertwined with map-dependent traffic rules, it makes autonomous vehicles difficult to understand the different behaviours of multi-agents in a scenario.

Vectorization is applied in the prior art to represent the relationship between agents and road segments. To present a more compact scenario, the scenario is then processed through a graph neural network or point cloud model to understand the relationships between vectorized entities such as trajectory waypoints and lane segments. However, existing techniques globally model all relationships in spatial and temporal dimensions to capture fine-grained interactions between vectorized entities. However, with the increase in the number of entities, the calculation amount of the existing technology doubles exponentially. The existing processors cannot meet such a huge amount of calculation, and the calculation is blocked.

To solve the above-mentioned issue, the present invention aims for providing a method for solving the problem in the prior art that with the increase of the number of entities, the number of calculations doubles exponentially, and the existing processor cannot meet such a huge amount of calculation and the calculation is blocked.

SUMMARY OF THE INVENTION

It is an objective of the present invention to provide a method, device and storage media for multi-agent motion prediction.

In accordance with an aspect of the present invention, a method for predicting multi-agent motion is disclosed. The method comprises: taking each of the agents in a traffic scenario as a central agent respectively, and dividing the traffic scenario into different areas according to the central agent, obtaining a local eigenvector for each of the central agents in the area; obtaining long-range dependencies between each of the central agents by correcting coordinate system of the local eigenvectors between all of the central agents, and predicting the motion for each of the central agents in accordance with local eigenvectors of each of the central agents and the long-range dependencies.

In accordance with one embodiment of the present invention, taking each of the agents in the traffic scenario as a central agent respectively, and dividing a traffic scenario into different areas according to the central agent, further comprising: obtaining a current traffic scenario, the traffic scenario comprises trajectory information of several agents and lane information of map data.

In the traffic scenario, each agent is taken as the centre respectively to obtain areas adjacent to each other, wherein each area includes a central agent, and existing or non-existent adjacent agents.

In accordance with one embodiment of the present invention, before taking each of the agents in the traffic scenario as a central agent respectively, and dividing a traffic scenario into different areas according to the central agent, the method comprising: obtaining the traffic scenario; represents the trajectory information of the agent as a vector $$\{p_i^t - p_i^{t-1}\}_{t=1}^T,$$

wherein $$p_i^t \in R^2,\ p_i^t$$

is the coordinate of agent i at time t, $$p_i^{t-1} \text{is}$$

the coordinate of agent i at time t−1, $R^2$ is 2-dimensional real number field.

Determining the lane information according to the start coordinate and end coordinate of the lane running by the agent, wherein the ending coordinate is $$p_\xi^1,$$

the starting coordinate is $$p_\xi^0,$$

the lane information is $$p_\xi^1 - p_\xi^0,\ p_\xi^1,\ p_\xi^0 \in R^2.$$

In accordance with one embodiment of the present invention, obtaining the local eigenvectors of each of the central agents in the area, further comprising:

obtaining interaction information and time-dependent information of the central agent in the area.

aggregating the interaction information and the time-dependent information of the central agent in each area as the local eigenvectors of that central agent.

In accordance with one embodiment of the present invention, interaction information of the central agent comprises interaction information of the central agent and the adjacent agents, and interaction information of a central agent and a road segment.

In accordance with one embodiment of the present invention, obtaining interaction information of the central agent in the area further comprises:

Importing trajectory information of the central agent to a first MLP model to obtain a first mapping vector of the central agent:

$$z_i^t = \phi_{center}([R_i^T(p_i^t - p_i^{t-1}), a_i])$$

Importing trajectory information of the adjacent agents in the same area as the central agent into a second MLP model to obtain a second mapping vector of the central agent:

$$z_{ij}^t = \phi_{nbr}([R_i^T(p_i^t - p_i^{t-1}), R_i^T(p_j^t - p_i^t), a_j])$$

wherein $\emptyset_{center}$ is the first MLP model, $\emptyset_{nbr}$ is the second MLP model, $R_i$ is rotation matrix, its rotation angle is orientation of the central agent, $\alpha_i$ are semantic attributes of the central agent, $\alpha_j$ are semantic attributes of the adjacent agents;

Key-value vectors of the central agent and the adjacent agent $$q_i^t, k_{ij}^t$$

and $$v_{ij}^t$$

are determined following the formulas $$q_i^t = W^{Q^{space}} z_i^t, k_{ij}^t = W^{K^{space}} z_{ij}^t$$

and $$v_{ij}^t = W^{V^{space}} z_{ij}^t$$

respectively, wherein $W^{Q^{space}}$, $W^{K^{space}}$ and $$W^{V^{space}}$$

are learnable matrices, $$W^{Q^{space}}, W^{K^{space}} \text{ and } W^{V^{space}} \in R^{d_k \times d_h},$$

$d_k$ and $d_h$ are scaling vector;

Obtaining the interaction information of the central agent and the adjacent agent $\hat{z}_i^t$ in accordance with the following formulas:

$$\alpha_i^t = \text{softmax}\left(\frac{q_i^{t^T}}{\sqrt{d_k}} \cdot \left[\{k_{ij}^t\}_{j \in N_i}\right]\right)$$

$$m_i^t = \sum_{j \in N_i} \alpha_{ij}^t v_{ij}^t$$

$$g_i^t = \text{sigmoid}(W^{gate}[z_i^t, m_i^t])$$

$$\hat{z}_i^t = g_i^t \odot W^{self} z_i^t + (1 - g_i^t) \odot m_i^t$$

wherein $N_i$ is adjacent agent, $W^{gate}$ and $W^{self}$ are learnable matrices, and $\odot$ is the symbol of element-wise product;

Obtaining the interaction information of the central agent and the road segments according to the following formula:

$$z_{i\xi} = \phi_{lane}([R_i^T, (p_\xi^1 - p_\xi^0), R_i^T(p_\xi^0 - p_i^T), a_\xi])$$

wherein $\emptyset_{lane}$ is third MLP model, $$p_\xi^0$$

is a start coordinate of the lane segment, $$p_\xi^1$$

is an end coordinate of the lane segment and $\alpha_\zeta$ are semantic attributes of the lane segment.

In accordance with one embodiment of the present invention, obtaining the time-dependent information of the central agent in the area further comprises:

Obtaining time information at a preset time point, $$Q_i = S_i W^{Q^{time}}, K_i = S_i W^{K^{time}} \text{ and } V_i = S_i W^{V^{time}},$$

$$\text{wherein } W^{Q^{time}}, W^{K^{time}} \text{ and } W^{V^{time}}$$

are learnable matrices.

the time information to obtain the time-dependent information:

$$\hat{S}_i = \text{softmax}\left(\frac{Q_i K_i^T}{\sqrt{d_k}} + M]V_i\right)$$

In accordance with one embodiment of the present invention, obtaining long-range dependencies between each of the central agents by correcting coordinate system of the local eigenvectors between all of the central agents, further comprises:

Determining a first trajectory coordinate point of a first central agent $$p_j^T$$

and a second trajectory coordinate point of the second central agent $$p_i^T$$

respectively at the same time steps. The relative orientation of the first central agent and the second central agent is $\Delta\theta_{ij}$.

Obtaining mapping matrix of the central agent in accordance with the formula:

$$e_{ij} = \emptyset_{rel}\left(\left[R_i^T\left(p_j^T - p_i^T\right), \cos(\Delta\theta_{ij}), \sin(\Delta\theta_{ij})\right]\right),$$

wherein $\emptyset_{rel}$ is a fourth MLP model and $R_i$ is 2-dimensional real number field.

The global parameters $\tilde{q}_i$, $\widetilde{k_{ij}}$ and $\widetilde{v_{ij}}$ may be obtained according to the formula $$\tilde{q}_i = W^{Q^{global}} h_i, \widetilde{k_{ij}} = W^{K^{global}}[h_j, e_{ij}] \text{ and } \widetilde{v_{ij}} = W^{V^{global}}[h_j, e_{ij}]$$

respectively, wherein $$W^{Q^{global}}, W^{K^{global}} \text{ and } W^{V^{global}}$$

are learnable matrices, $h_i$ are eigenvectors of the first central agent in a corresponding area, $h_j$ are eigenvectors of the second central agent in the corresponding area.

The long-range dependencies between the first central agent may be obtained according to the global parameters $\tilde{q}_i$, $\widetilde{k_{ij}}$ and $\widetilde{v_{ij}}$.

By using the above-mentioned method, obtaining long-range dependencies between all of the central agents.

In accordance with another aspect of the present invention, a computing device is provided, comprising a memory, a processor, and a computer program stored in the memory and executed by the processor, wherein the computer program is executed by a processor to implement any one method for multi-agent motion prediction described above.

In accordance with another aspect of the present invention, a computer-readable storage medium is provided, the computer-readable storage medium stores computer programs configured for execution by the processor for performing execution a processor to implement any one method for the multi-agent motion prediction described above.

In the present invention, one local area is determined by selecting one central agent from a global area, and local eigenvectors of the central agent in a local area may be obtained. The local eigenvectors represent the relationship between the central agent and adjacent agent, the relationship between the central agent and the lane, and the relationship between the past status and the current status of the central agent in the local area. In this way, the amount of computation may be reduced. In order to compensate for the loss of vision, information is transferred between different local areas to obtain long-range dependencies between different local areas, and finally, motion prediction is performed for each of the central agents.

In order to make the aforementioned and other objects, features and advantages of the present invention comprehensible, preferred embodiments accompanied by figures are described in detail below.

BRIEF DESCRIPTION OF THE DRAWINGS

Embodiments of the invention are described in more detail hereinafter with reference to the drawings, in which.

DETAILED DESCRIPTION

Figure 1:
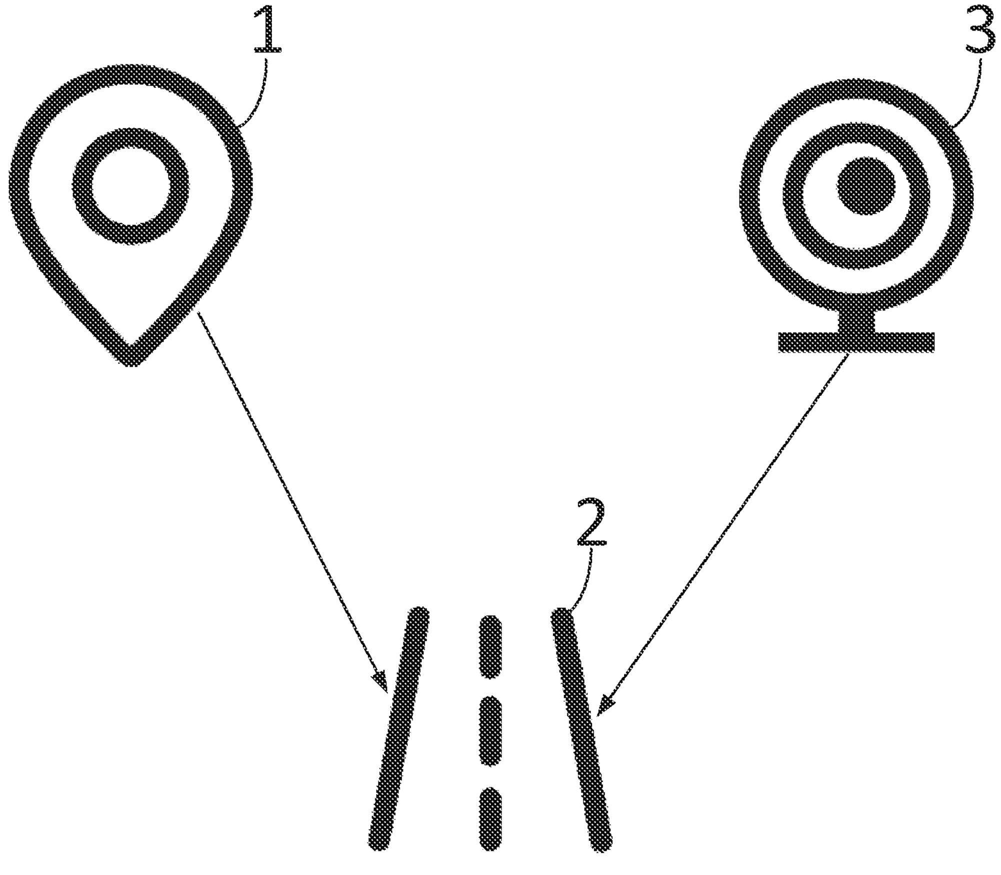
FIG. 1 depicts the overall system diagram of a multi-agent motion prediction according to the embodiment of the present invention.

In the following description, method, device and storage media for multi-agent motion prediction and the likes are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

The technical solutions in the embodiments of the disclosure will be clearly and completely described below in conjunction with the drawings in the embodiments of the disclosure. It is apparent that the described embodiments are not all embodiments but only part of the embodiments of the disclosure. All other embodiments obtained by those of ordinary skill in the art based on the embodiments in the disclosure without creative work shall fall within the scope of protection of the disclosure.

It should be noted that the user information (including but not limited to user equipment information, user personal information, etc.) and data (including but not limited to analysis data, stored data, displayed data, etc.) involved in this application, which is all information and data authorized by the user or fully authorized by all parties.

The selection of the coordinate system is required for motion prediction. From the perspective of the selection of the coordinate system, the existing methods can be mainly divided into two types. One is to establish a coordinate system centred on the vehicle, and the other is to establish a coordinate system centred on an agent to be predicted. Since sensors such as cameras are installed on the self-driving car, and the positions of other objects are relative to the position of the sensor, it can be considered that the self-driving car is in the centre of the entire scenario.

If a coordinate system is established with an autonomous vehicle as the centre, all surrounding agents can be predicted efficiently at the same time, but this application found that the prediction accuracy of this method will be lower than that of establishing a coordinate system based on each agent to be predicted and make multiple predictions. However, it is inefficient to establish a coordinate system for each agent and perform multiple single-agent predictions, especially in the case of a large number of agents. This prediction efficiency cannot meet the high-speed operation scenario of the vehicle.

In this paper, a translation-invariant scenario representation and a rotation-invariant model are used. All agents in the scenario can be modelled symmetrically, so that the model can predict all agents at once, and the prediction accuracy is on par with the method of establishing a coordinate system based on each agent and making multiple predictions.

Here, entities include the agent to be predicted and the lane segment on the high-definition map. Three relationships may be considered in the present invention, one is the relationship between different agents (spatial relationship); the other is the relationship between past and current states of the same agent (temporal relationship); the last is the relationship between agent and the lane segment.

FIG. 1 illustrates an overall system diagram of a multi-agent motion prediction that may be applicable in a vehicle. The system comprises GPS 1, prediction module 2 and camera 3.

GPS 1 is used to determine coordinate information of the vehicle and obtain lane information.

Camera 3 is used to capture the position information of all vehicles in the current field of view.

Prediction module 2 is used to obtain the position information of all vehicles in camera 3, and perform symmetrical modelling for the corresponding agent of each of the vehicles to obtain the spatial relationship between different agents (for example, two vehicles facing each other and two vehicles in parallel etc.); Prediction module 2 is used to determine the relationship between the agent and the lane segment in the field of view according to the own the coordinate information of GPS 1 and sight distance of camera 3 (in two lanes on the left, one lane on the right, or pressure line, etc.); Prediction module is also used to determine the relationship between the past and current status of the same agent in the field of view based on coordinate information of GPS 1 and the sight distance of camera 3 (continuously turning left, continuing to turn right, or continuing to go straight, etc.).

Prediction module 2 may obtain the agent-agent dependency after the global massage passing of the above three types of information, and finally obtains the prediction result of the agent.

Vectorization is applied in the prior art to represent the relationship between the agents and the road segments. To present a more compact scenario, the scenario is then processed through a graph neural network or point cloud model to understand the relationships between vectorized entities such as the trajectory waypoints and the lane segments. However, existing techniques globally model all relationships in spatial and temporal dimensions to capture fine-grained interactions between vectorized entities. With the increase in the number of agents, the calculation amount of the existing technology doubles exponentially. The existing processors cannot meet such a huge amount of calculation, and the calculation is blocked.

Figure 2:
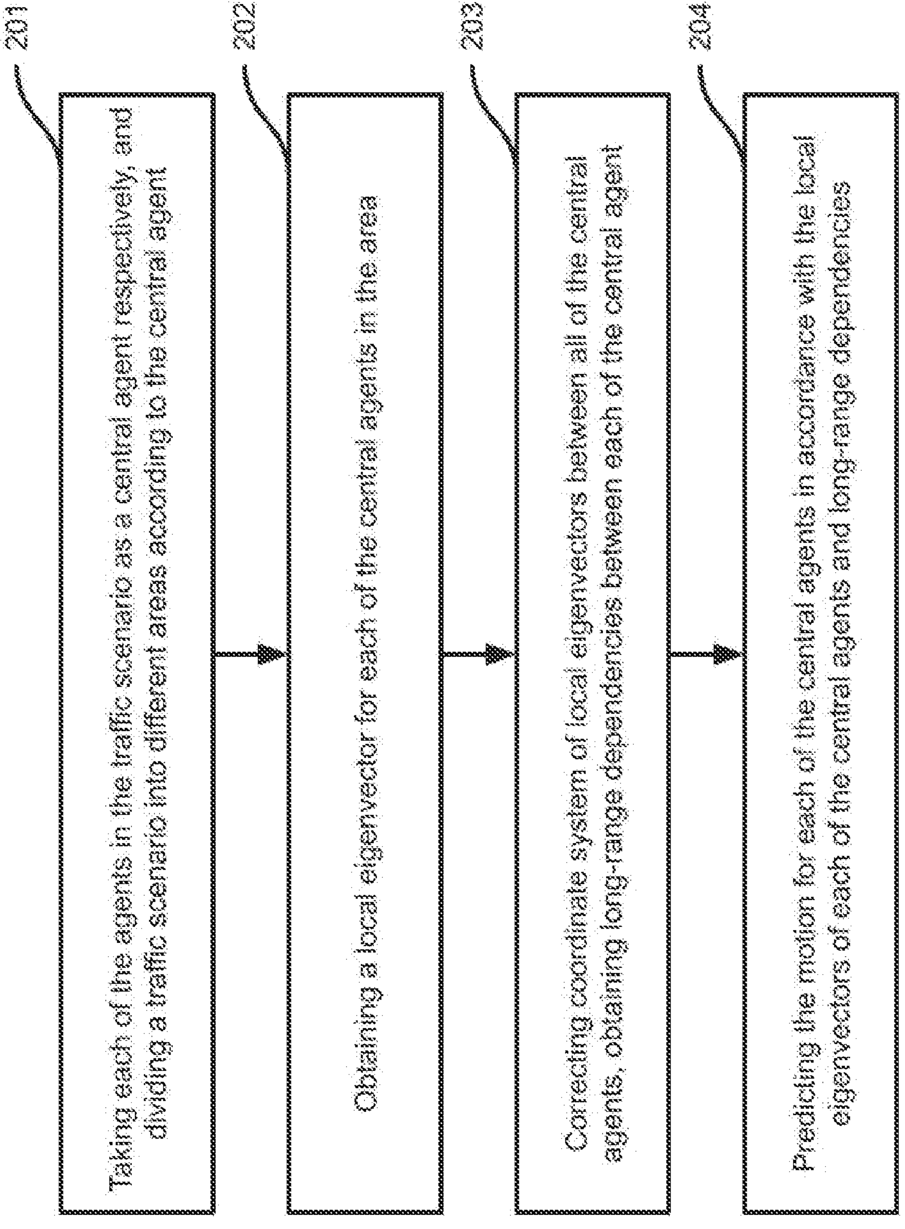
FIG. 2 depicts a schematic diagram of the processes of the multi-agent motion prediction method according to the embodiment of the present invention.

In order to solve the above problems, the embodiment of the present invention provides a method for the multi-agent motion prediction, the amount of computation may be reduced on the premise of ensuring the prediction accuracy of multi-agent. FIG. 2 illustrates a schematic diagram of the processes of the multi-agent motion prediction method according to the embodiment of the present invention. The present specification provides the operation steps of the method according to implementation or flowchart, the conventional or non-creative means can include more or fewer operation steps. The sequence of steps enumerated in the implementations is merely one of a plurality of step execution sequences and does not represent a unique execution sequence. In the actual execution of an apparatus or a terminal product, execution can be performed based on a method sequence shown in the implementations or the accompanying drawings, or performed in parallel. As illustrated in FIG. 2, the method may comprise:

In process 201, taking each of the agents in the traffic scenario as a central agent respectively, and dividing a traffic scenario into different areas according to the central agent.

In process 202, obtaining a local eigenvector for each of the central agents in the area.

In process 203, correcting the coordinate system of local eigenvectors between all of the central agents, obtaining long-range dependencies between each of the central agents.

In process 204, predicting the motion for each of the central agents in accordance with the local eigenvectors of each of the central agents and long-range dependencies.

In the present invention, by determining one local area through selecting one central agent from a global area, local eigenvectors of the central agent in a local area may be obtained. The local eigenvectors represent the relationship between central agent and adjacent agent, the relationship between the central agent and the lane, and the relationship between the past status and the current status of the central agent in the local area. In this way, the amount of computation may be reduced. Then, to compensate for the lost field of view (the local area where the central agent is located cannot fully characterize the running scenario where the vehicle is located). The information is transferred between the local areas, and the coordinate systems of different local areas are corrected to obtain different long-range dependencies between different local areas. Finally, the motion prediction is performed for each of the central agents.

Here, agents may be traffic participants, such as nearby vehicles, motorcycles, bicycles, and pedestrians encountered during vehicle driving.

Here, a global area generally refers to all areas within the perception range of the vehicle. The local area used in the present invention is determined by the radius. The radius used in the present invention is 50 meters, that is, the area within a circle with a radius of 50 meters centred on the agent to be predicted is the local area.

Figure 6:
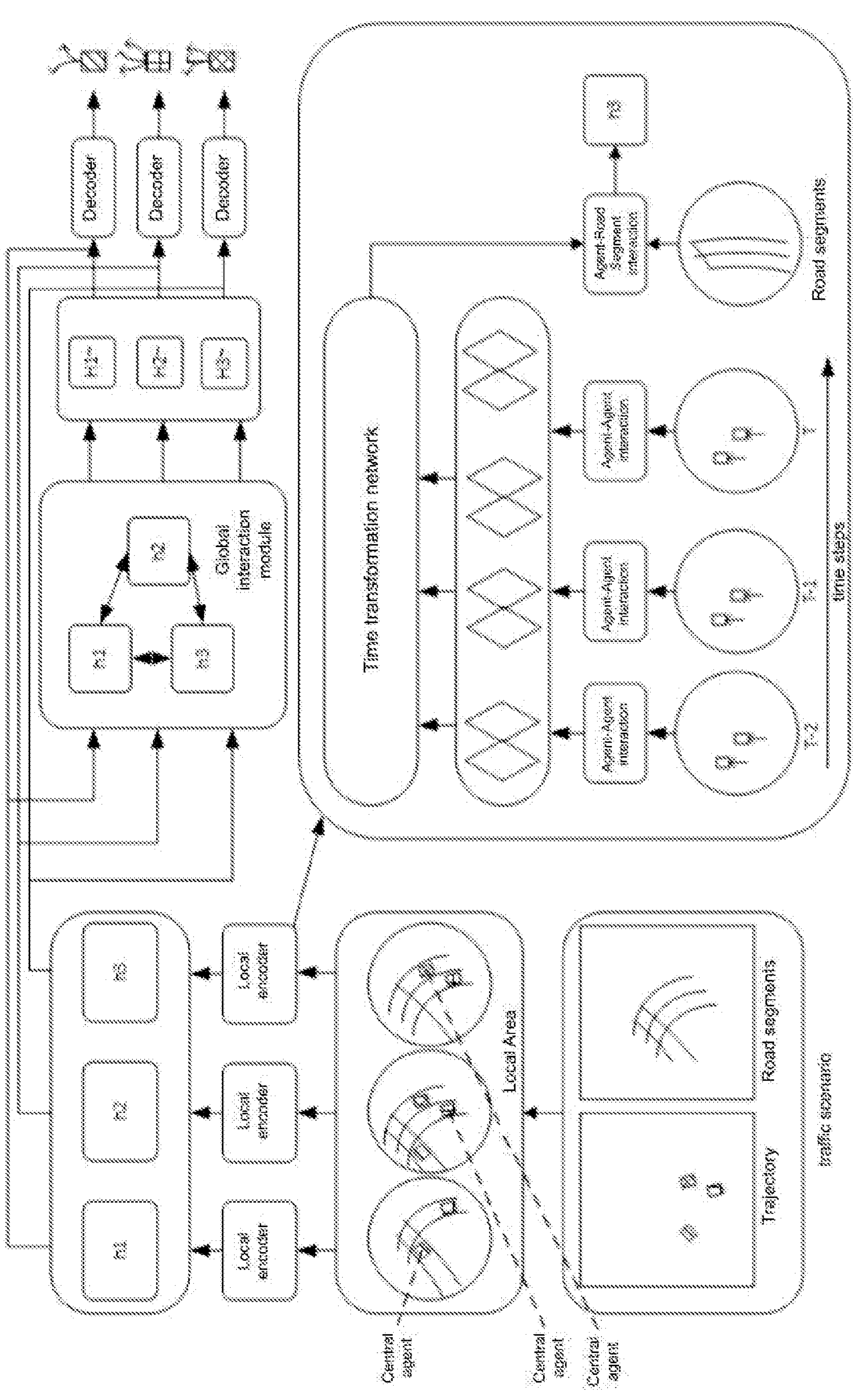
FIG. 6 depicts the overall schematic diagram of the prediction process of the embodiment of the present invention.

FIG. 6 illustrates the overall schematic diagram of the prediction process. In FIG. 6, firstly, in the traffic scenario, the trajectory information and the road segment information of the agent are obtained (the rectangular frame is the agent, and the solid line is the road segment). In FIG. 6, there are three agents, and then the local areas where the three agents are located are obtained respectively. In the present invention, only one central agent in each local area. In a local area, a coordinate system is established with the central agent as the centre. In this coordinate system, the environment where the central agent is located is obtained, where the environment can include traffic participants near the agent and map elements such as lanes near the agent. According to the research of this paper, hidden dangers or threats come from the agent about 50 meters away in cases such as traffic accidents, so this paper believes that other agents, lanes, etc. within 50 meters of the agent may potentially be the future of the agent. Therefore, the local area of this article is an area within a radius of 50 meters centered on the central agent.

Before performing process 201, comprising:

Obtaining the traffic scenario;

Representing the trajectory information of the agent as a vector $$\{p_i^t - p_i^{t-1}\}_{t=1}^T,$$

wherein $$p_i^t \in R^2,\ p_i^t$$

is the coordinate of agent i at time t, $$p_i^{t-1}$$

is the coordinate of agent i at time t−1, $R^2$ is a 2-dimensional real number field;

Determining the lane information according to the start coordinate $$(p_\xi^0)$$

and end coordinate $$(p_\xi^1)$$

of the lane running by the agent, wherein the lane information is:

$$p_\xi^1 - p_\xi^0,\ p_\xi^1 \text{ and } p_\xi^0 \in R^2.$$

The application scenario of this paper is to predict the future motion trajectory of an agent given the motion trajectory of the agent in the past several seconds. If 2 seconds of the history motion trajectory are observed and 3 seconds of the future motion trajectory are required to predict. Then it is equivalent to observing 20 historical time steps, forecast 30 time steps into the future. if the observation frequency of the sensor of the vehicle is 10 Hz.

A "trajectory segment" is formed by every two consecutive coordinate points. A first coordinate point and a second coordinate point form a first trajectory segment. The second coordinate point and a third coordinate point form a second trajectory segment, . . . and so on. Assuming that the current time step is T, "the last trajectory segment" of history trajectory refers to the trajectory segment formed by the coordinate point of time step T−1 and the coordinate point of time step T. Orientation of the trajectory segment may be similar to the orientation of the agent at that moment. Therefore, we use the trajectory segment as the reference vector of the local area where the agent is located. As shown in the time step in the lower right corner of FIG. 6, it represents the relationship between agents at time step T−2, T−1 to T.

In this step, the trajectory of the agent uses the subtraction between coordinate points (that is, in the subsequent local scenario, the position information represented by the vector is also used, and the vector can obtain the specific result by subtracting the two coordinates, and no matter how the coordinate system is selected, the subtraction results of the two coordinate points are invariant) to represent a motion trajectory segment or a lane segment, this representation has translation invariance, which makes the multi-agent prediction in this paper more efficient.

In order for those skilled in the art to have a comprehensive understanding, an example is given in this article. For example, after making a difference in the position coordinates, a vector A and a vector B are obtained (A and B can represent the trajectory segments generated by two different agents respectively, the trajectory segment or the lane segment). In order to describe the relative position between these two vectors, we make a difference between the original starting coordinate point of vector A and the original starting coordinate point of vector B. The result of this difference is used to describe the relative position of A and B. A vector of relationships.

It can be seen that, in the prior art, there is a start coordinate point and an end coordinate point no matter the trajectory segment or the lane segment. A vector is obtained by subtracting the end coordinate point and the start coordinate point in this paper. The vector has only size and direction, no position, and has the characteristics of translation-invariance.

Figure 3:
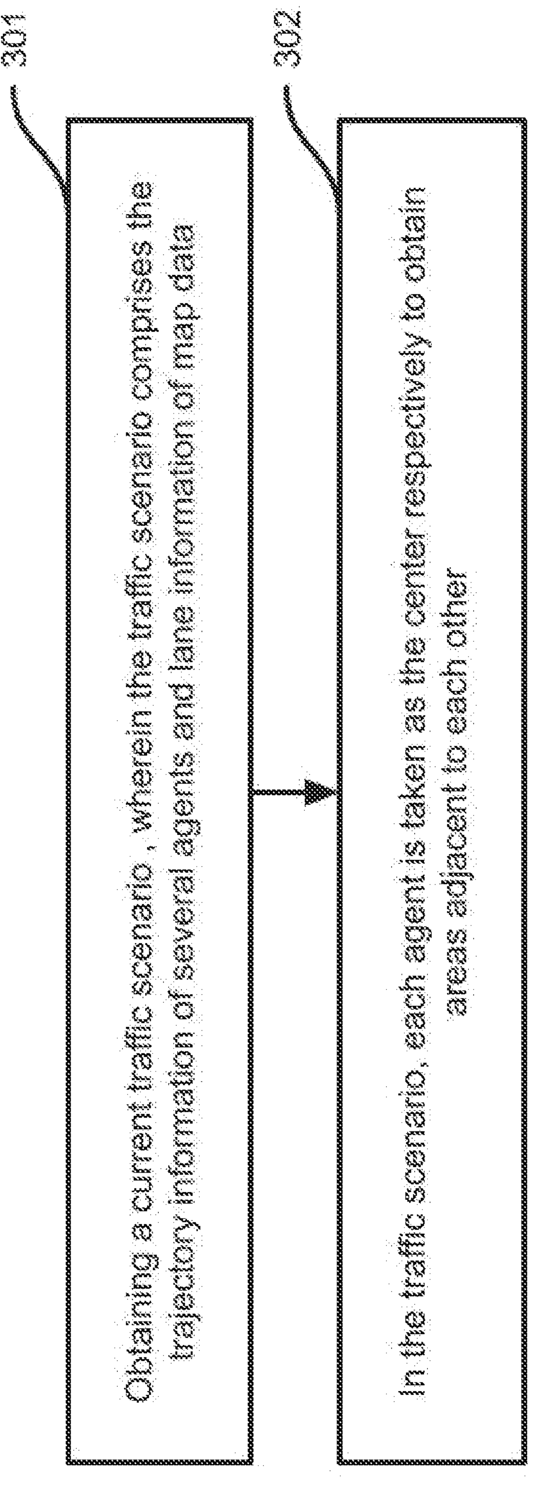
FIG. 3 depicts the process of dividing different areas into local areas according to the embodiment of the present invention.

FIG. 3 illustrates a process for dividing different areas. In accordance with one embodiment of the present invention, in process 201, taking each of the agents in the traffic scenario as a central agent respectively, and dividing the traffic scenario into different areas according to the central agent, further comprising:

In process 301, obtaining a traffic scenario, wherein the traffic scenario comprises the trajectory information of several agents and lane information of map data.

In process 302, in the traffic scenario, each agent is taken as the centre respectively to obtain areas adjacent to each other, wherein each area includes a central agent and existing or non-existent adjacent agents.

In this process, the vehicle may obtain the information of all agents of the camera and the lane information through the camera and GPS. If there are 5 agents in the camera, a local area is set for each of the 5 agents respectively. Each agent acts as a central agent in the local area, and after turning into a central agent, takes all other agents within a radius of 50 meters from the central agent as the adjacent agents of the central agent.

As shown in FIG. 6, for the convenience of illustration, the prediction method in this paper will be divided into the first stage and the second stage. The first stage runs in the local encoder. During the first stage, the local eigenvectors of each of the central agents in the local area are extracted respectively.

The second stage runs in a global interaction module. After the local eigenvectors of each local area are obtained, the local eigenvectors of each local area will be fused in the second stage. Global eigenvectors of the local areas is obtained. At this time, motion prediction is performed through the global eigenvectors.

However, each local area is extracted in a different coordinate system (reflected in the orientation of the coordinate axis of the coordinate system of the local area, and the orientation of the x-axis of the local area is the same as the orientation of the central agent). Hence, when fusing the feature of each local area, it is necessary to know the difference between the coordinate system (geometric relationship between the local eigenvectors). The "geometric relationship between local features" mentioned here refers to the difference between the coordinate systems used in different local areas, the difference in the orientation of the coordinate axis, and the relative positions between the centre points of different local areas.

First, this article will introduce how to determine the local eigenvectors of the central agent in the local area.

In the present invention, the local eigenvectors refer to all vectors in the local area where a central agent is located, including the motion trajectory segment of the central agent itself, the motion trajectory segment of the agents near the central agent, and the lane segment near the central agent.

Figure 4:
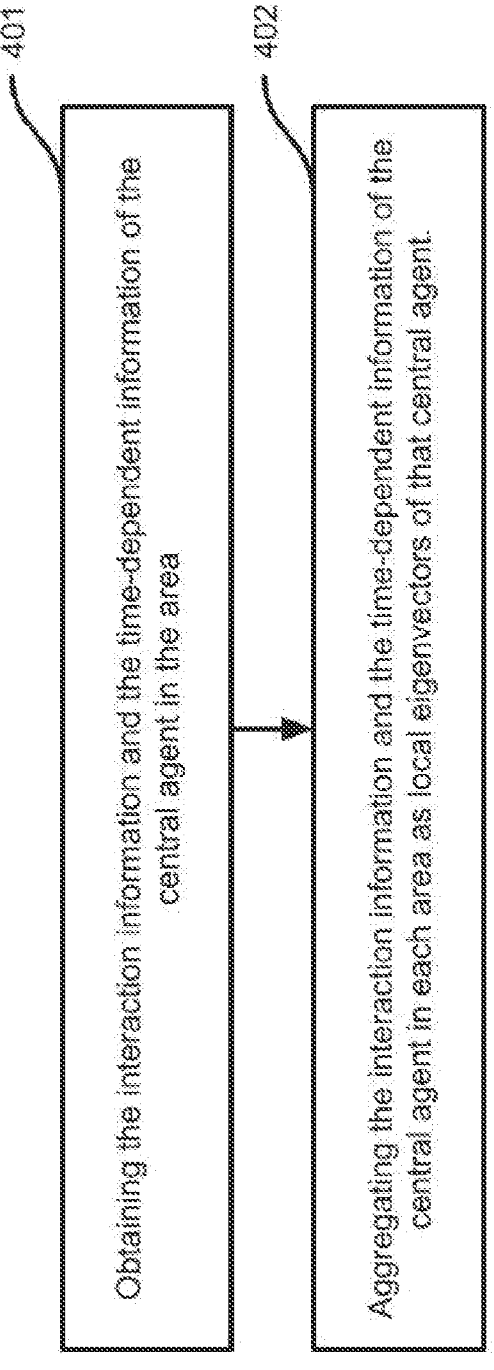
FIG. 4 depicts the process of obtaining local eigenvectors according to the embodiment of the present invention.

As illustrated in FIG. 4, a process for obtaining a local eigenvector, process 202 obtaining a local eigenvector of each of the central agents in the local area, further comprises:

In process 401, obtaining the interaction information and the time-dependent information of the central agent in the area.

In this process, the interaction information of the central agent comprises the interaction information of the central agent and the adjacent agent, and the interaction information of the central agent and road segments.

Preferably, obtaining the interaction information of the central agent and the adjacent agent in the area, further comprising:

It should be noted that, in this paper, semantic attributes for an agent refer to its type, i.e., the type attributes such as a vehicle, pedestrian, or bicycle. Semantic attributes for a lane refer to all information unrelated to geometry, such as whether the lane is a left turn lane, a straight lane or a right turn lane, whether the lane is at an intersection, whether the lane has a speed limit, etc . . . .

In the present invention, splicing a trajectory segment vector or a lane segment vector together with the semantic attributes corresponding to the vector, and then input to a decoder (MLP model), and the output of the MLP model is the eigenvectors.

This step performs the following operations for each time step of each local area: the features of the adjacent agents in the local area are weighted and averaged $$(\alpha_i^t, m_i^t),$$

and the weighted and averaged features are fused into the features of central agent $$(g_i^t, \hat{z}_i^t).$$

After this step, the features of each of the central agents are updated at each time step. Only the features of the central agent are updated here, and the features of the surrounding agents are not updated.

In the present invention, the first MLP model and the second MLP model runs in the agent-agent interaction exemplary module as illustrated in FIG. 6.

Importing the trajectory information of the central agent to the first MLP model to obtain the first mapping vector of the central agent:

$$z_i^t = \phi_{center}\left(\left[R_i^T\left(p_i^t - p_i^{t-1}\right), a_i\right]\right)$$

Importing the trajectory information of the adjacent agents to the second MLP model to obtain the second mapping vector of the central agent:

$$z_{ij}^t = \phi_{nbr}\left(\left[R_i^T\left(p_i^t - p_i^{t-1}\right), R_i^T\left(p_j^t - p_i^t\right), \alpha_j\right]\right)$$

wherein $\emptyset_{center}$ is the first MLP model, $\emptyset_{nbr}$ is the second MLP model, $R_i$ is the rotation matrix, its rotation angle is the orientation of the central agent, $\alpha_i$ are semantic attributes of the central agent, $\alpha_j$ are semantic attributes of the adjacent agent;

Key-value vectors of the central agent and the adjacent agent $$q_i^t, k_{ij}^t$$

and $$v_{ij}^t$$

are determined following the formulas $$q_i^t = W^{Q^{space}} z_i^t,$$

$$k_{ij}^t = W^{K^{space}} z_{ij}^t$$

and $$v_{ij}^t = W^{V^{space}} z_{ij}^t$$

respectively, wherein $$W^{Q^{space}}, W^{K^{space}} \text{ and } W^{V^{space}}$$

are learnable matrices, $$W^{Q^{space}}, W^{K^{space}} \text{ and } W^{V^{space}} \in R^{d_k \times d_h},$$

$d_k$ and $d_h$ are scaling vector;

Obtaining the interaction information of the central agent and the adjacent agent $\hat{z}_i^t$ in accordance with the following formulas:

$$\alpha_i^t = \text{softmax}\left(\frac{q_i^{t^T}}{\sqrt{d_k}} \cdot \left[\{k_{ij}^t\}_{j \in N_i}\right]\right)$$

$$m_i^t = \sum_{j \in N_i} \alpha_{ij}^t v_{ij}^t$$

$$g_i^t = \text{sigmoid}(W^{gate}[z_i^t, m_i^t])$$

$$\hat{z}_i^t = g_i^t \odot W^{self} z_i^t + (1 - g_i^t) \odot m_i^t$$

wherein $N_i$ is the adjacent agent, $W^{gate}$ and $W^{self}$ are learnable matrices, $\odot$ is the symbol of the element-wise product.

The features can be fused in a weighted average manner through the above formula.

The MLP module is used for the agent-agent interaction schematic module, the purpose is to perform a weighted average of the characteristics of multiple adjacent agents, and use the formula $$\alpha_i^t = \text{softmax}\left(\frac{q_i^{t^T}}{\sqrt{d_k}} \cdot \left[\{k_{ij}^t\}_{j \in N_i}\right]\right)$$

is integrated into the features of the central agent, so as to achieve the purpose of modelling the influence of adjacent agents on the central agent.

The trend of the agent's movement over time contains rich information. Using this trend in time, the model can infer the agent's intention in the future to a certain extent, such as acceleration, deceleration, and turning.

After the agent-agent interaction exemplary module obtains the features of the central agent at each of the time steps, and the features of the central agent at each of the time steps may be inputted into a time transformation network. A single feature (the time-dependent information) is obtained by summarizing the agent features at different time steps by appending additional eigenvectors, i.e., time information.

Preferably, input the above parameters into the time transformation network in FIG. 6, obtaining the time-dependent information of the central agent in the area, further comprising:

Obtaining time information at a preset time point, $$Q_i = S_i W^{Q^{time}},\ K_i = S_i W^{K^{time}} \text{ and } V_i = S_i W^{V^{time}},$$

wherein $W^{Q^{time}}$, $W^{K^{time}}$ and $W^{V^{time}}$ are learnable matrices;

Weight normalizing the time information to obtain the time-dependent information:

$$\hat{S}_i = \text{softmax}\left(\frac{Q_i K_i^T}{\sqrt{d_k}} + M]V_i\right)$$

In the present invention, the third MLP module runs in agent-road segments interaction exemplary module as illustrated in FIG. 6.

Preferably, obtaining the interaction information of central agent and road segments in the area, further comprising:

Obtaining the interaction information between the central agent and the road segment according to the following formula:

$$z_{i\xi} = \phi_{lane}\left(\left[R_i^T\left(p_\xi^1 - p_\xi^0\right), R_i^T\left(p_\xi^0 - p_i^T\right), \alpha_\xi\right]\right)$$

wherein $\varnothing_{lane}$ is the third MLP model, $$p_\xi^0$$

is a start coordinate of the lane segment, $$p_\xi^1$$

is the end coordinate of the lane segment and $\alpha_\xi$ are semantic attributes of the lane segment.

In process 402, aggregating the interaction information and the time-dependent information of the central agent in each area as local eigenvectors of that central agent.

In this process, in order to further capture the expected motion of the central agent in different time steps, corresponding time-dependent information is given in different position vectors mentioned in this paper. Here, the "position" in the "position vector" refers to the position in time, and the timestamp information is added to the interaction information after obtaining the position information. For example, if there are T time steps, a randomly initialized vector is created for 1, 2, . . . , T, respectively, so each randomly initialized vector has a one-to-one correspondence with time steps. The T randomly initialized vectors $$\left(W^{Q^{time}},\ W^{K^{time}} \text{ and } W^{V^{time}}\right)$$

are optimized and updated by the stochastic gradient descent algorithm during the training process, and hence they are called learnable. We add these T vectors to the T eigenvectors of the input sequence of the module, which is equivalent to incorporating the time step and time-dependent information into the interaction information. Then we updated each interaction information to get the more accurate interaction information.

From the above, the complexity of the prior art can be reduced from $$O\left((NT + L)^2\right) \text{ to } O\left(NT^2 - TN^2 + NL\right),$$

wherein N is the number of agents, T is the history time steps and L is the number of lane segments.

In FIG. 6, for the convenience of the explanation, agent h3 is used to illustrate the editing process of a local encoder, h1 and h2 are also the same that need to go through the editing process of the local encoder.

After obtaining local eigenvectors of h1, h2 and h3, importing local eigenvectors to the global interaction module illustrated at FIG. 6 at the same time.

Only the direction may be represented through the coordinate system established in the local area, and the relative position may not be obtained. Therefore, all of the relative position of the agent in different area may be obtained through interaction.

In accordance with one embodiment of the present invention, the fourth MLP model runs in the global interaction module, process 204 predicting the motion for each of the central agents in accordance with the local eigenvectors of each of the central agents and long-range dependencies, further comprising:

In this process, determining a first trajectory coordinate point of the first central agent $$p_j^T$$

and a second trajectory coordinate point of the second central agent $$p_i^T$$

respectively in the same time step, the relative orientation of the first central agent and the second central agent $\Delta\theta_{ij}$.

The mapping matrix of the central agents may be obtained according to the formula $$e_{ij} = \phi_{rel}\left(\left[R_i^T\left(p_j^T - p_i^T\right), \cos(\Delta\theta_{ij}), \sin(\Delta\theta_{ij})\right]\right),$$

wherein $\phi_{rel}$ is the fourth MLP model.

The global parameters $\tilde{q}_i$, $\widetilde{k_{ij}}$ and $\widetilde{v_{ij}}$ may be obtained according to the formula $$\tilde{q}_i = W^{Q^{global}} h_i, \widetilde{k_{ij}} = W^{K^{global}}[h_j, e_{ij}] \text{ and } \widetilde{v_{ij}} = W^{V^{global}}[h_j, e_{ij}]$$

respectively. wherein $$W^{Q^{global}}, W^{K^{global}} \text{ and } W^{V^{global}}$$

are learnable matrices, $h_i$ are the eigenvectors of the first central agent in the corresponding area, $h_j$ are the eigenvectors of the second central agent in the corresponding area.

The long-range dependencies between the central agents may be obtained according to the global parameters $\tilde{q}_i$, $\widetilde{k_{ij}}$ and $\widetilde{v_{ij}}$ (H1~, H2~ or H3~ illustrated in FIG. 6).

By using the above-mentioned method, the long-range dependencies between each of the central agents may be obtained (H1~, H2~ and H3~).

As an embodiment of this paper, using the above method, the long-range dependencies between each of the central agents may be obtained, comprising:

The long-range dependencies are input to the trained decoder, and the decoder outputs 6 trajectories for each agent and the probability value corresponding to each trajectory based on these long-range dependencies. Among them, each trajectory consists of several two-dimensional coordinate points, and the number of output coordinate points depends on the number of future time steps that need to be predicted.

Since 6 trajectories and the corresponding probability value for each of future trajectories for each agent is needed to predict in the present invention. Therefore, the distribution of future trajectories is parameterized as a multimodal distribution with 6-peaks. The multimodal distribution is weighted by 6 unimodal distributions. The mean and variance of each unimodal distribution correspond to the mean and variance of one of the possible future trajectories of the agent, and the weight of the unimodal distribution is the probability value corresponding to the future trajectory. All mean, variance, and weights are the output of the decoder and are trained by gradient descent algorithm.

Figure 5:
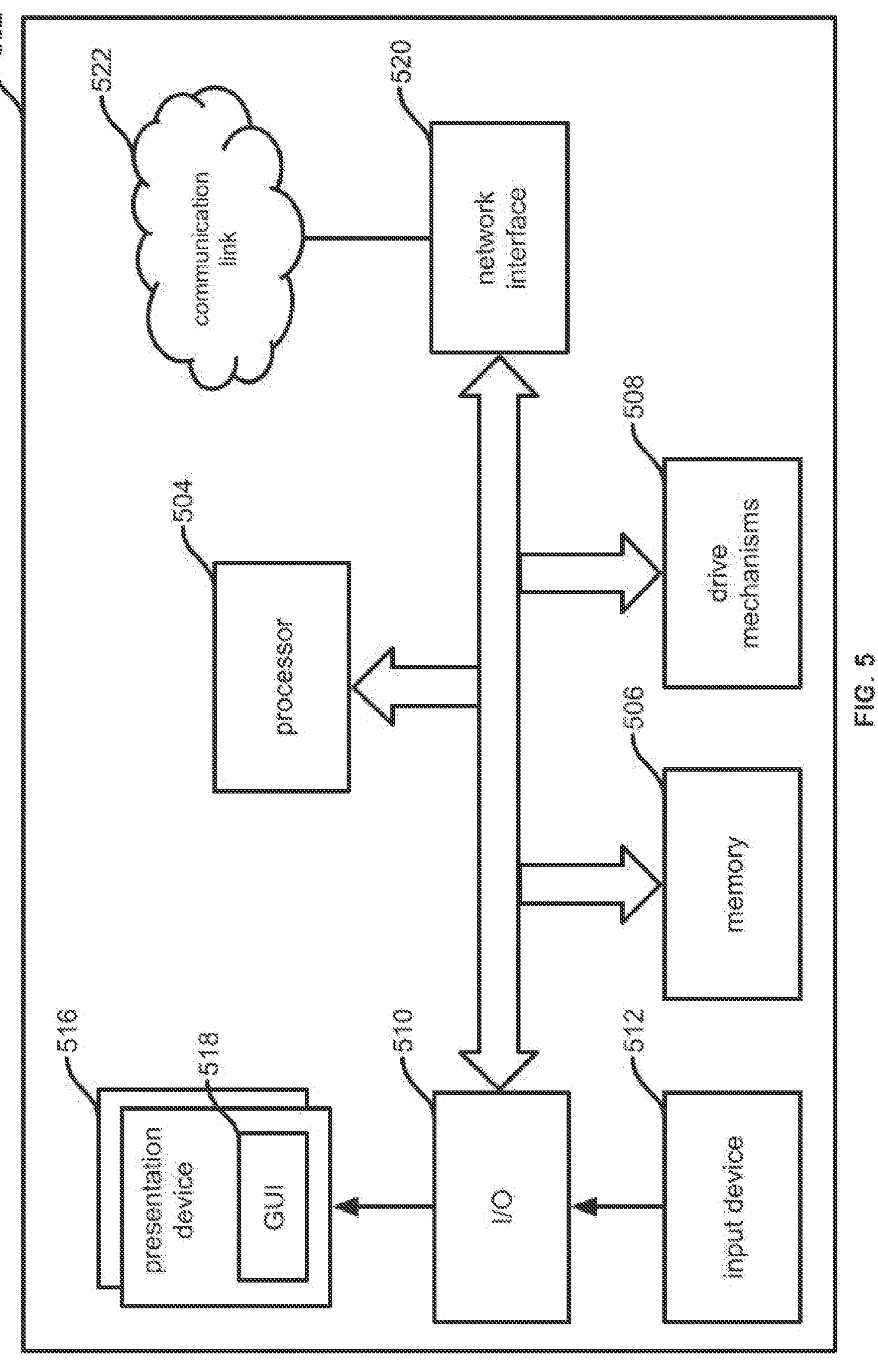
FIG. 5 depicts a schematic diagram of the computing device according to the embodiment of the present invention.

As shown in FIG. 5, a computing device is provided for performing the multi-agent motion prediction method according to the embodiments of the present invention. Computing device 502 may comprise one or more processor 504, such as one or more central processing units (CPU), each of which may implement one or more hardware threads. The computing device 502 may also include any memory 506 for storing any kind of information, such as code, settings, data, etc. Without limitation, for instance, the memory 506 may include any one or a combination of the following: any of RAM of any type(s), ROM of any type(s), flash devices, hard disks, optical disks, and so on. More generally, any storage resource can use any technology for storing information. In another embodiment, any memory may provide volatile or nonvolatile retention of information. In another embodiment, any memory can represent as a fixed or removable component of computing device 502. In one embodiment, when processor 504 executes the corresponding instruction stored in any memory or the combination of memory, computing device 502 may execute any of the corresponding instructions. The computing device 502 also includes one or more drive mechanism 508 for interacting with any storage, such as a hard disk drive mechanism, an optical disk drive mechanism, and so on.

Computing device 502 may further comprise I/O module 510, which is used for receiving various inputs (through input device 512) and used for providing various outputs (through output device 514). A specific output mechanism may comprise presentation device 516 and associated Graphical User Interface (GUI) 518. In another embodiment, I/O module 510, input device 512 and output device 514 may not be included, and only serve as a computer device in the network. Computing device 502 may further comprise one or more network interface 520 for exchanging data with other devices via one or more communication link 522. One or more communication buses 524 couple the components described above together.

Communication link 522 may be implemented in any way, such as through Local Area Network (LAN), Wide Area Network (WAN) (e.g., Internet), end-to-end connection etc. or in any combination. Communication link 522 can include any combination of hardwired links, wireless links, routers, gateway functionality, name servers, etc., governed by any protocol or combination of protocols.

The embodiments herein also provide a computer-readable storage medium, corresponding to the methods in FIG. 2-4, having a computer program stored on the computer-readable storage medium, and the processes of the above method are implemented when the computer program is executed by a processor.

The embodiment of the present application also provides computer-readable instruction. When the instruction is executed in the processor, the program causes the processor to perform operation steps comprised in the method as shown in FIG. 2-4.

Terms such as “first” and “second” in the specification, claims and forgoing drawings of the disclosure are only to distinguish similar objects and are not used to describe specific sequence or order. It should be understood that such terms can be interchanged as appropriate, and it is merely a way to distinguish objects having the same attributes in describing the embodiments of the disclosure. In addition, the terms ‘include’, ‘comprise’ and any variant thereof intends to cover a non-exclusive inclusion, thus a process, a method, a system, a product or a device including a series of elements is not limited to include these elements, but may also include other elements not clearly set out or intrinsic elements of the process, method, product or device.

It should be understood that the sequence numbers of the foregoing procedures do not indicate an execution sequence. The execution sequence of the procedures should be determined according to functions and internal logic thereof, and should not constitute any limitation to the implementation procedure of the embodiment of the present invention.

It also should be understood that the term “and/or” in this specification describes only an association relationship for describing associated objects and represents those three relationships that may exist. For example, A and/or B may represent the following three cases: Only A exists, both A and B exist, and only B exists. In addition, the character “/” in this specification generally indicates an “or” relationship between the associated objects.

Those of ordinary skill in the art may be aware that units and algorithm steps of respective examples described in conjunction with the embodiments disclosed in the present disclosure may be implemented with electronic hardware or a combination of computer software and electronic hardware. Whether these functions are performed in hardware or software depends on specific applications and design constraint conditions of the technical solutions. Those skilled in the art may implement the described functions of each specific application by using different methods; however, it should not be considered that the implementations go beyond the scope of the present disclosure.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

In the several embodiments provided in this application, it should be understood that the disclosed system, apparatus, and method may be implemented in other manners. For example, the described apparatus embodiment is merely an example. For example, the unit division is merely a logical function division and may be another division in practical implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position or may be distributed on multiple network units. Some or all of the units may be selected according to actual needs to achieve the objectives of the solutions of the embodiments.

In addition, functional units in the embodiments of the present invention may be integrated into one processor, or each of the units may exist alone physically, or two or more units are integrated into one unit. The integrated unit may be implemented in a form of hardware or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The software product is stored in a storage medium and includes several instructions for instructing a computer device (which may be a personal computer, a server, or a network device) to perform all or some of the steps of the methods described in the embodiments of the present invention. The storage medium includes any medium that can store program code, such as a USB flash drive, a removable hard disk, a read-only memory (Read-Only Memory, ROM for short), a random-access memory (Random Access Memory, RAM for short), a magnetic disk, or an optical disc.

The embodiments of the present disclosure have been described in detail. The principle and implementation of the present disclosure have been clarified herein through specific examples. The description of the embodiments of the present disclosure is merely provided to help understand the method and the core idea of the present disclosure. In addition, a person of ordinary skill in the art can make variations and modifications to the present disclosure in the specific implementations and the application scope based on the idea of the present disclosure. Therefore, the content of the specification shall not be construed as a limitation on the present disclosure.

What is claimed is:

1. A multi-agent motion prediction method, based on coordinate information obtained using GPS and position information captured by a camera in a traffic scenario, which are received by a prediction module for symmetrical modeling, the method comprising:

a. taking each of a plurality of agents in the traffic scenario as a central agent respectively, and dividing the traffic scenario into different areas, each area associated with a respective central agent and serving as a local area for the respective central agent;

b. obtaining a local eigenvector for each of the central agents in its associated local area, comprising:

applying one or more multilayer perceptron (MLP) models and one or more space-domain learnable matrices that are optimized during a training process using a stochastic gradient descent algorithm to:

obtain time-dependent information of the central agent from features of the central agent at each of one or more time steps;

obtain agent-agent interaction information of the central agent and its adjacent agent;

obtain agent-road segment interaction information of the central agent and road segments in its associated local area; and aggregate the time-dependent information and the agent-agent interaction information and the agent-road segment interaction information in generating the local eigenvector;

wherein each of the local eigenvectors represents (i) a relationship between the central agent and its adjacent agent, (ii) a relationship between the central agent and a lane, and (iii) a relationship between a past status and a current status of the central agent in its associated local area;

c. correcting a coordinate system of local eigenvectors between all of the central agents, comprising:

obtaining a mapping matrix using a mapping-matrix MLP model; and applying the mapping matrix together with global-domain learnable matrices obtained through a training process to the local eigenvectors in obtaining long-range dependencies between each of the central agents representing relationships or interactions among the central agents across different local areas;

d. predicting a motion for each of the central agents in accordance with the local eigenvectors of the central agents and the long-range dependencies, wherein the predicting comprises:

splicing a trajectory segment vector together with a first semantic attribute corresponding to the trajectory segment vector, wherein the trajectory segment vector is derived from coordinate data representing movement of each of the agents, and the first semantic attribute provides descriptive information related to the corresponding agent;

splicing a lane segment vector together with a second semantic attribute corresponding to the lane segment vector, wherein the lane segment vector is derived from coordinate data representing lane geometry, and the second semantic attribute provides descriptive information related to the lane;

inputting a result of either the spliced trajectory segment vector or the spliced lane segment vector to a trained decoder comprising a trajectory-decoder MLP model, the trained decoder comprising learnable parameters that are trained using a stochastic gradient descent algorithm; and outputting, by the trained decoder, six predicted trajectories for each of the agents consisting of several two-dimensional coordinate points and corresponding probability values based on the long-range dependencies.

2. A computing device, comprising: a memory, a processor and a computer program stored on the memory and executable on the processor, wherein the computer program is executable by the processor that implements the multi-agent motion prediction method of claim 1.

3. A multi-agent motion prediction method, comprising:

determining coordinate information of a first traffic participant in a traffic scenario using GPS;

capturing, by a camera, position information of a plurality of second traffic participants within a current field of view of the camera in the traffic scenario;

obtaining, by a prediction module, the coordinate information provided by using GPS and the position information from the camera; and performing, by the prediction module, symmetrical modeling of a plurality of agents in the traffic scenario based on the second traffic participants, wherein the multi-agent motion prediction method further comprises:

a. taking, by the prediction module, each of the agents in the traffic scenario as a central agent respectively, and dividing the traffic scenario into different areas, each area associated with a respective central agent and serving as a local area for the respective central agent;

b. obtaining, by the prediction module, a local eigenvector for each of the central agents in its associated local area, comprising:

applying one or more multilayer perceptron (MLP) models and one or more space-domain learnable matrices that are optimized during a training process using a stochastic gradient descent algorithm to:

obtain time-dependent information of the central agent from features of the central agent at each of one or more time steps;

obtain agent-agent interaction information of the central agent and its adjacent agent;

obtain agent-road segment interaction information of the central agent and road segments in its associated local area; and aggregate the time-dependent information and the agent-agent interaction information and the agent-road segment interaction information in generating the local eigenvector;

wherein each of the local eigenvectors represents (i) a relationship between the central agent and its adjacent agent, (ii) a relationship between the central agent and a lane, and (iii) a relationship between a past status and a current status of the central agent in its associated local area;

c. correcting, by the prediction module, a coordinate system of local eigenvectors between all of the central agents, comprising:

obtaining a mapping matrix using a mapping-matrix MLP model; and applying the mapping matrix together with global-domain learnable matrices obtained through a training process to the local eigenvectors in obtaining long-range dependencies between each of the central agents representing relationships or interactions among the central agents across different local areas; and d. predicting, by the prediction module, a motion for each of the central agents in accordance with the local eigenvectors of the central agents and the long-range dependencies, wherein the predicting comprises:

splicing a trajectory segment vector together with a first semantic attribute corresponding to the trajectory segment vector, wherein the trajectory segment vector is derived from coordinate data representing movement of each of the agents, and the first semantic attribute provides descriptive information related to the corresponding agent;

splicing a lane segment vector together with a second semantic attribute corresponding to the lane segment vector, wherein the lane segment vector is derived from coordinate data representing lane geometry, and the second semantic attribute provides descriptive information related to the lane;

inputting a result of either the spliced trajectory segment vector or the spliced lane segment vector to a trained decoder comprising a trajectory-decoder MLP model, the trained decoder comprising learnable parameters that are trained using a stochastic gradient descent algorithm; and outputting, by the trained decoder, six predicted trajectories for each of the agents consisting of several two-dimensional coordinate points and corresponding probability values based on the long-range dependencies.

4. The method of claim 3, wherein the traffic scenario is divided into different areas by determining, for each central agent, a local area within a radius of 50 meters centered on the central agent.

5. The method of claim 3, wherein an environment where the central agent is located comprises traffic participants within a radius of 50 meters from the central agent and map elements including lanes within the radius of 50 meters from the central agent.

6. The method of claim 5, wherein the traffic participants comprise vehicles, motorcycles, bicycles, and pedestrians that are encountered during vehicle driving and are within the radius of 50 meters from the central agent.

* * * * *